United States Patent
Kadokura et al.

(10) Patent No.: US 12,222,740 B2
(45) Date of Patent: Feb. 11, 2025

(54) ELECTRIC DISCHARGE MACHINE

(71) Applicant: FANUC CORPORATION, Yamanashi (JP)

(72) Inventors: Hiromitsu Kadokura, Yamanashi-ken (JP); Ryousuke Suganuma, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/286,573

(22) PCT Filed: Apr. 19, 2021

(86) PCT No.: PCT/JP2021/015861
§ 371 (c)(1),
(2) Date: Oct. 12, 2023

(87) PCT Pub. No.: WO2022/224302
PCT Pub. Date: Oct. 27, 2022

(65) Prior Publication Data
US 2024/0201712 A1    Jun. 20, 2024

(51) Int. Cl.
*G05D 7/06* (2006.01)
*F15B 15/20* (2006.01)
(Continued)

(52) U.S. Cl.
CPC ......... *G05D 7/0635* (2013.01); *F15B 15/202* (2013.01); *B23H 1/10* (2013.01); *B23H 11/00* (2013.01)

(58) Field of Classification Search
CPC ..... G05D 7/0635; F15B 15/202; B23H 11/00; B23H 1/10
(Continued)

(56) References Cited

U.S. PATENT DOCUMENTS 5,073,691 A * 12/1991 Magara ............... B23H 7/10
226/97.1
5,874,702 A * 2/1999 Hayakawa ........... B23H 1/10
219/69.12
(Continued)

FOREIGN PATENT DOCUMENTS

| JP | 2000210818 A | 8/2000 |
|---|---|---|
| JP | 6391867 B1 | 9/2018 |
| JP | 2019166609 A | 10/2019 |

OTHER PUBLICATIONS

International Search Report issued by the Japan Patent Office acting as the International Searching Authority in relation to International Application No. PCT/JP2021/015861 dated Jul. 6, 2021 (3 pages) along with English language translation (2 pages).
(Continued)

*Primary Examiner* — Minh Q Le
(74) *Attorney, Agent, or Firm* — Robert P. Michal, Esq.; Carter, DeLuca & Farrell LLP

(57) ABSTRACT

An electric discharge machine capable of suppressing scattering and overflow of a liquid flowing out of a drain port. An electric discharge machine according to one embodiment includes a liquid tank for storing a liquid; a drain valve which opens/closes a drain port for draining the liquid stored in the liquid tank; an actuator which drives the drain valve; a liquid level sensor which detects the level of the liquid stored in the liquid tank; and a control unit which controls the actuator so that as the liquid level detected by the liquid level sensor is lower, the opening amount of the drain valve becomes greater.

7 Claims, 3 Drawing Sheets

(51) Int. Cl.
*B23H 1/10* (2006.01)
*B23H 11/00* (2006.01)

(58) Field of Classification Search
USPC .................................. 137/101.25; 219/69.12
See application file for complete search history.

(56) References Cited

U.S. PATENT DOCUMENTS

| | | | | |
|---|---|---|---|---|
| 7,947,917 | B2* | 5/2011 | Kita ...................... | B23H 11/00 |
| | | | | 210/86 |
| 9,884,383 | B2* | 2/2018 | Hada ...................... | B23H 7/36 |
| 2005/0023195 | A1* | 2/2005 | Kita ........................ | B23H 1/10 |
| | | | | 210/90 |
| 2007/0278190 | A1* | 12/2007 | Kita ........................ | B23H 1/10 |
| | | | | 219/69.12 |
| 2013/0161242 | A1* | 6/2013 | Kasai ...................... | B23H 1/10 |
| | | | | 210/85 |
| 2015/0273601 | A1* | 10/2015 | Kasai .................... | B23H 7/101 |
| | | | | 219/69.14 |
| 2016/0288231 | A1* | 10/2016 | Nakashima ............ | B23H 11/00 |
| 2017/0087656 | A1* | 3/2017 | Hasegawa ................ | B23H 7/02 |
| 2017/0304921 | A1* | 10/2017 | Wybrow .................. | B23H 7/36 |
| 2018/0021869 | A1* | 1/2018 | Nishikawa ............... | B23H 1/02 |
| | | | | 700/162 |
| 2019/0084064 | A1* | 3/2019 | Kasai ...................... | B23H 7/36 |
| 2019/0255637 | A1* | 8/2019 | Yamasaki ............... | G01F 23/14 |
| 2023/0256555 | A1* | 8/2023 | Yamaoka ................ | B23H 7/04 |
| | | | | 700/195 |
| 2023/0264282 | A1* | 8/2023 | Ookubo ............... | B01D 35/143 |
| | | | | 702/34 |
| 2024/0082937 | A1* | 3/2024 | Suganuma ............... | B23H 1/10 |

OTHER PUBLICATIONS

Written Opinion of the International Searching Authority issued by the Japan Patent Office acting as the International Searching Authority in relation to International Application No. PCT/JP2021/015861 dated Jul. 6, 2021 (3 pages).

* cited by examiner

ELECTRIC DISCHARGE MACHINE

CROSS-REFERENCE TO RELATED APPLICATIONS

This application is a national phase entry under 35 U.S.C. 371 of PCT International Application No. PCT/JP2021/015861, filed Apr. 19, 2021, the disclosure of this application is expressly incorporated herein by reference in its entirety.

TECHNICAL FIELD

The present invention relates to an electric discharge machine for machining a workpiece by means of electric discharge generated by applying a voltage to a gap between an electrode and the workpiece.

BACKGROUND ART

JP 2000-210818 A discloses a wire electric discharge machine in which an opening/closing door provided so as to be able to open/close a drain port of a work-pan is discharged-driven by an actuator. In this wire electric discharge machine, the height of the liquid surface of dielectric working fluid in the work-pan when the work-pan is stopped is detected by a liquid surface detection sensor, and the draining time corresponding to the detected height is calculated.

SUMMARY OF THE INVENTION

However, in the case of the wire electric discharge machine of JP 2000-210818 A, when the open/close door is fully opened at the time of draining, although the time until there is no liquid left in the work-pan (draining time) is shortened, there is a concern about scattering and overflowing of the liquid flowing out from the drain port.

Therefore, it is an object of the present invention to provide an electric discharge machine capable of reducing scattering and overflowing of liquid flowing out from a drain port.

An electric discharge machine including a liquid tank configured to store liquid, a drain valve configured to open and close a drain port for draining the liquid stored in the liquid tank, and an actuator configured to drive the drain valve, the electric discharge machine further including a liquid level sensor configured to detect a liquid level of the liquid stored in the liquid tank, and a control unit configured to control the actuator in a manner so that the amount of opening of the drain valve increases as the liquid level detected by the liquid level sensor decreases.

According to the aspect of the present invention, it is possible to suppress changes in the amount of outflow, which is the amount of liquid flowing out of the drain port per unit time, and as a result, it is possible to reduce scattering and overflowing of the liquid flowing out of the drain port and at the same time to suppress the prolongation of the drainage time.

DETAILED DESCRIPTION OF THE INVENTION

Preferred embodiments of the present invention are described in detail below with reference to the accompanying drawings.

Embodiment

Figure 1:
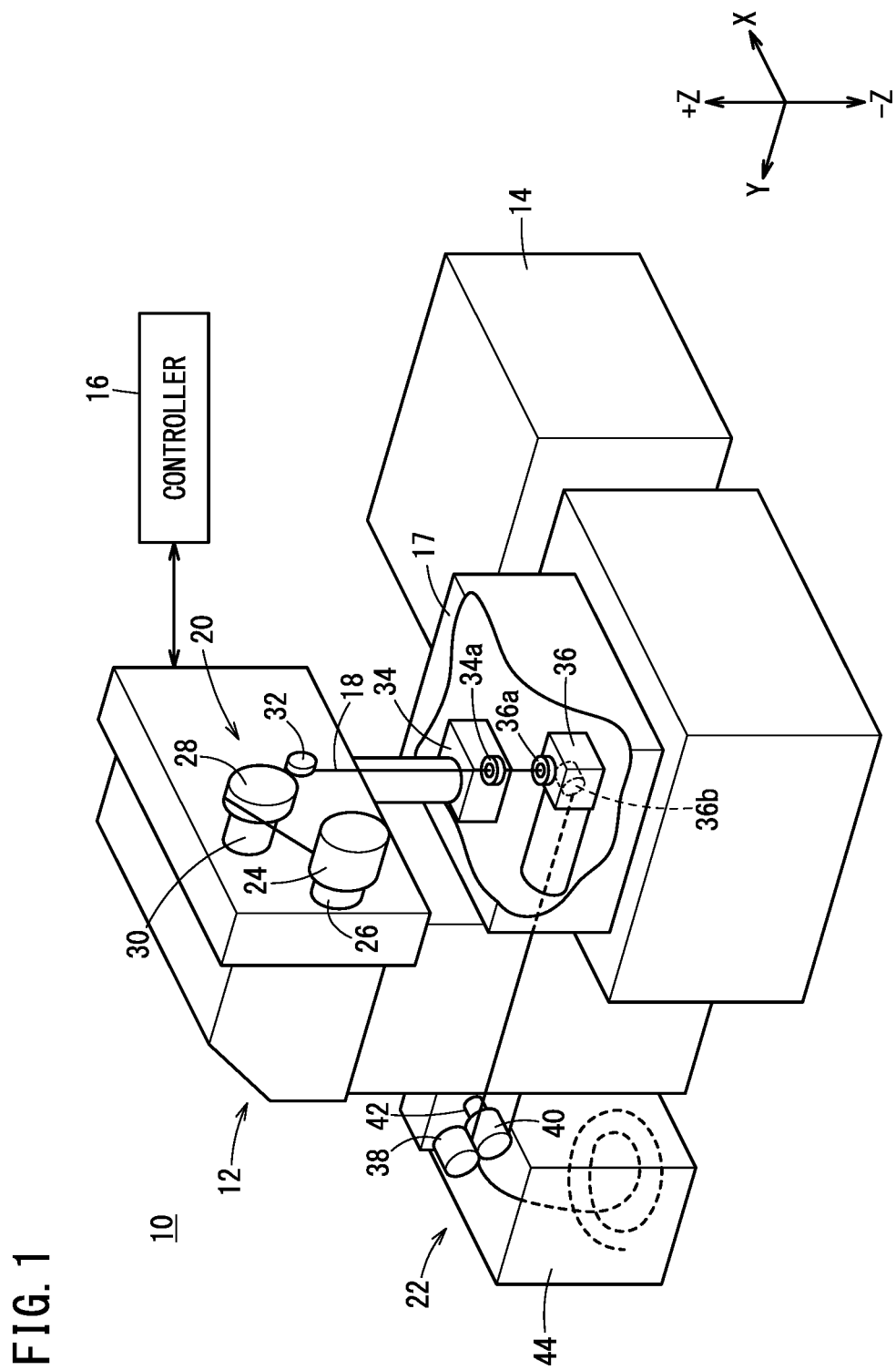
FIG. 1 is a schematic diagram showing the configuration of an electric discharge machine.

FIG. 1 is a schematic diagram showing the configuration of an electric discharge machine 10 according to an embodiment. FIG. 1 shows the X, Y and Z directions in which the axis possessed by the electric discharge machine 10 extends. The X direction and the Y direction are orthogonal to each other in a plane, and the Z direction is orthogonal to each of the X direction and the Y direction. Note that the −Z direction is a direction in which gravity acts (gravity direction).

The electric discharge machine 10 machines a workpiece by electric discharge generated by applying a voltage to a gap between it and the workpiece. The workpiece is also referred to as an object to be processed. The electric discharge machine 10 is provided with a machine main body 12, a dielectric fluid unit 14, and a controller 16 for controlling the machine main body 12 and the dielectric fluid unit 14.

The machine main body 12 includes a work-pan 17 for storing liquid for immersing the workpiece, and an electrode 18 for machining the workpiece. A table for holding the workpiece is provided inside the work-pan 17. The electrode 18 is relatively movable with respect to this table. In a state where the workpiece and the electrode 18 are immersed in liquid stored in the work-pan 17, a voltage is applied to the gap between the electrode 18 and the workpiece, and the workpiece is machined by electrical discharge generated at the gap. Sludge can be produced during this machining.

The dielectric fluid unit 14 supplies liquid (dielectric working liquid) used for machining the workpiece to the work-pan 17. As examples of the dielectric working fluid, deionized water and suchlike can be raised. The dielectric fluid unit 14 may collect the dielectric working fluid discharged from the work-pan 17. When the dielectric working fluid discharged from the work-pan 17 is collected, the dielectric fluid unit 14 may remove sludge contained in the collected dielectric working fluid, may adjust the liquid quality or the like of the collected dielectric working fluid, or may return to the work-pan 17 dielectric working fluid from which the sludge has been removed and in which the liquid quality or the like has been adjusted.

The electrode 18 of the machine main body 12 may be a wire electrode or a shaped electrode for die sinking. FIG. 1 shows the machine main body 12 in which the electrode 18 is a wire electrode. When the electrode 18 is a wire electrode, the machine main body 12 is provided with a supply system 20 for supplying the electrode 18 to the workpiece, and a collecting system 22 for collecting the electrode 18 that has passed through the workpiece.

The supply system 20 has a wire bobbin 24 around which an unused electrode 18 is wound, a torque motor 26 that applies torque to the wire bobbin 24, a brake shoe 28 that applies to the electrode 18 braking force generated by friction, a brake motor 30 that applies braking torque to the brake shoe 28, a tension detection unit 32 that detects the magnitude of tension of the electrode 18, and an upper die guide 34 that guides the electrode 18 above the workpiece.

The collecting system 22 has a lower die guide 36 that guides the electrode 18 below the workpiece, a pinch roller 38 and a feed roller 40 that can sandwich the electrode 18, a torque motor 42 that applies torque to the feed roller 40, and a collecting box 44 that collects the electrode 18 conveyed by the pinch roller 38 and the feed roller 40.

The upper die guide 34 is provided with a support portion 34*a* for supporting the electrode 18, and the lower die guide 36 is provided with a support portion 36*a* for supporting the electrode 18. The lower die guide 36 is also provided with a guide roller 36*b* that turns the electrode 18 and guides it to the pinch roller 38 and the feed roller 40.

At the time of machining, the upper die guide 34 and the lower die guide 36 are placed in the work-pan 17 and immersed in the dielectric working fluid stored in the work-pan 17. In addition, at least the upper die guide 34 out of the upper die guide 34 and the lower die guide 36 may jet clean dielectric working fluid that does not contain sludge, toward the gap between the electrode 18 and the workpiece. When the clean machining fluid is jetted toward the gap between the electrode 18 and the workpiece, the gap is filled with clean fluid suitable for machining, whereby deterioration in machining accuracy due to sludge generated in accordance with machining can be reduced.

Figure 2:
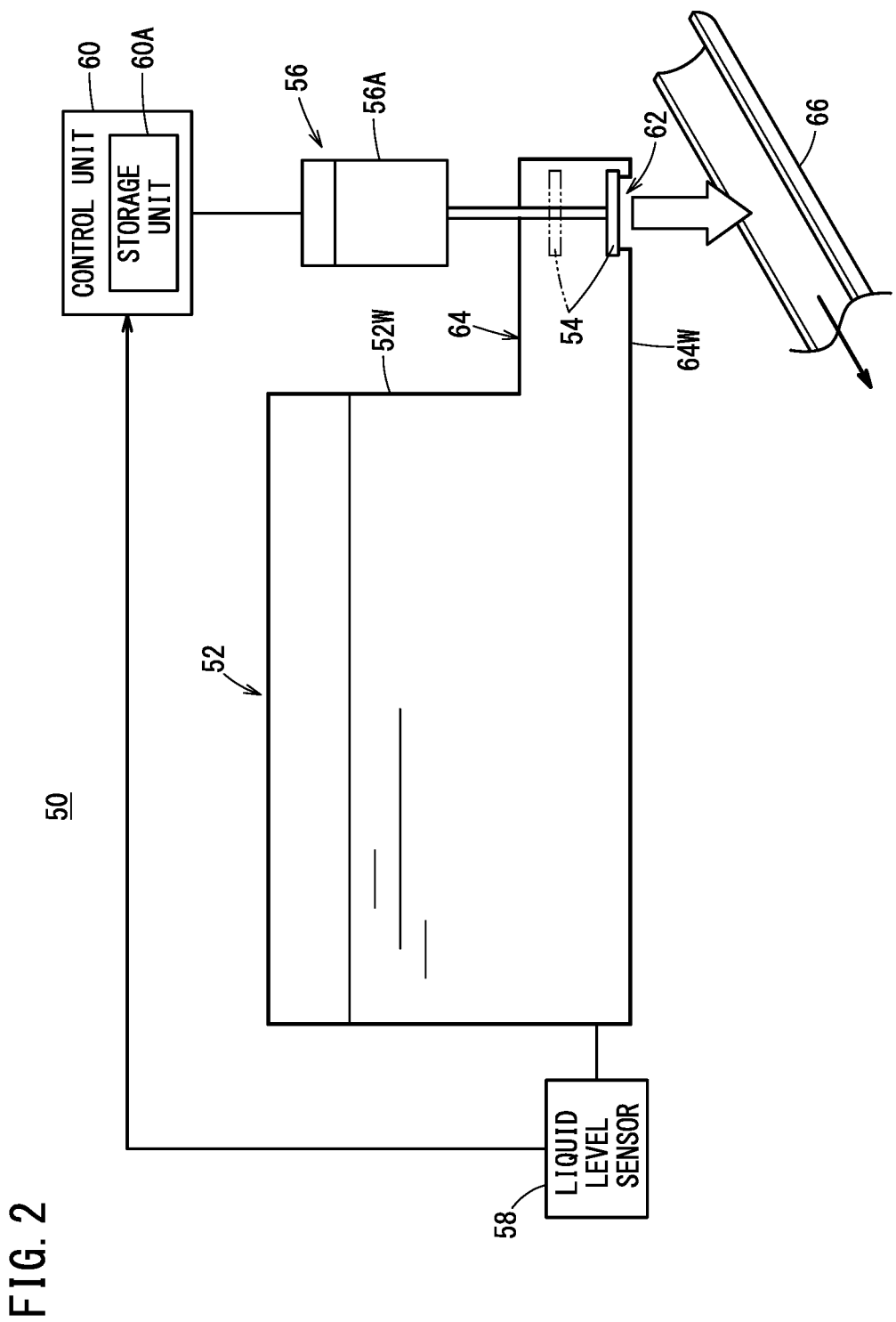
FIG. 2 is a diagram showing the configuration of a drainage mechanism of the electric discharge machine.

FIG. 2 is a diagram showing the configuration of a drainage mechanism 50 of the electric discharge machine 10. The drainage mechanism 50 is a mechanism for draining the liquid stored in a liquid tank 52. The liquid tank 52 may be the work-pan 17. When the dielectric fluid unit 14 collects the dielectric working fluid, the liquid tank 52 may be a dirty water tank or a fresh water tank provided in the dielectric fluid unit 14. The sewage tank is a tank for storing sludge-containing dielectric working fluid (sewage), and the fresh water tank is a tank for storing dielectric working fluid (fresh water) that has come from the sewage tank and passed through a filter for removing sludge.

The drainage mechanism 50 is provided with a drain valve 54, an actuator 56, a liquid level sensor 58, and a control unit 60.

The drain valve 54 is a valve for opening and closing a drain port 62 for draining the liquid stored in the liquid tank 52. The drain port 62 may be provided in the liquid tank 52 or may be provided in a communicating portion 64 that communicates with the liquid tank 52. FIG. 2 shows a case where the drain port 62 is provided in the communicating portion 64. The drain valve 54 is disposed so as to cover the drain port 62 provided at a bottom wall 64W of the communicating portion 64.

The configuration of the communicating portion 64 is not particularly limited. In FIG. 2, the communicating portion 64 protrudes outward from a side wall 52W of the liquid tank 52, and has a box-like shape in such a way that the capacity and height of the communicating portion 64 are smaller than those of the liquid tank 52 and an inner bottom surface of the communicating portion 64 has the same height as an inner bottom surface of the liquid tank 52.

The actuator 56 drives the drain valve 54. The actuator 56 drives the drain valve 54 in such a way that the amount of opening of the drain valve 54 with respect to the drain port 62 can vary. When the drain valve 54 closes the drain port 62, the amount of opening of the drain valve 54 is 0. When the amount of opening of the drain valve 54 is greater than 0, the liquid stored in the liquid tank 52 flows out from the drain port 62 via the communicating portion 64 and falls on its own weight to a liquid-receiving portion of a drain channel 66. The drain channel 66 supplies the liquid that has fallen into the liquid-receiving portion of the drain channel 66 to, for example, the dielectric fluid unit 14.

The actuator 56 may be pneumatic, electric, hydraulic, or solenoidal one. In the case of this embodiment, the actuator 56 is electric one and has a servomotor 56A. The servomotor 56A rotates under the control of the control unit 60 to vary the amount of opening of the drain valve 54. That is, the servomotor 56A drives the drain valve 54 in the direction away from the drain port 62 (in the direction opposite to the direction of gravity) according to the rotation in the positive direction (or negative direction) to increase the amount of opening of the drain valve 54. In addition, the servomotor 56A drives the drain valve 54 in a direction (gravitational direction) of approaching the drain port 62 according to the rotation in the negative direction (or positive direction) to reduce the amount of opening of the drain valve 54.

The liquid level sensor 58 detects the liquid level of the dielectric working fluid stored in the liquid tank 52, and outputs a signal indicating the liquid level. The liquid level sensor 58 may be either contact or non-contact one. Examples of the contact liquid level sensor 58 include a float type, a capacitance type, an electrode type, a pressure type, a differential pressure type, etc. Examples of the non-contact liquid level sensor 58 include a radio wave type, an ultrasonic type, etc.

The float type is configured to convert into a level a rotation angle of a pulley connected via a wire to a float placed on the liquid surface. The capacitance type is configured to convert into a level a change in capacitance between a probe and a wall of a container. The electrode type is configured to convert into a level a change in electrical resistance between electrodes over a length corresponding to a liquid level. The pressure type is configured to convert into a level the deformation of a diaphragm due to a liquid level. The differential pressure type is configured to convert into a level a change in differential pressure between the liquid pressure and a container's internal pressure. The radio wave type is configured to emit the microwave changing its frequency, measure a difference in frequency between an incoming signal having reflected off the liquid surface and a transmission signal emitted at that time, and converts the difference into a level. The ultrasonic type is configured to measure and convert into a level the time taken for pulse ultrasound waves to reflect off a measurement object and come back.

The control unit 60 controls the actuator 56 and is provided in the controller 16. During a machining halt time when machining of the workpiece is stopped, the control unit 60 changes the amount of opening of the drain valve 54 through control over the actuator 56. In this embodiment, the control unit 60 can precisely change the amount of opening of the drain valve 54 by controlling the servomotor 56A of the actuator 56.

The higher the liquid level of the liquid stored in the liquid tank 52 during the machining halt time, the higher the water pressure of the liquid, resulting in that the amount of outflow increases that is the amount of liquid flowing out from the drain port 62 per unit time. Therefore, when the amount of opening of the drain valve 54 is fully opened from an initial stage of drainage, scattering and overflow of liquid falling from the drain port 62 to the liquid-receiving portion of the drain channel 66 are likely to occur in the initial stage of drainage. In addition, if the amount of opening of the drain valve 54 is fixed at a relatively small state from the initial stage of drainage, the drainage time is likely to be prolonged.

Therefore, the control unit 60 controls the actuator 56 in a manner so that the amount of opening of the drain valve 54 with respect to the drain port 62 increases as the liquid level detected by the liquid level sensor 58 decreases. This makes it possible to suppress changes in the amount of outflow, the amount of liquid flowing out of the drain port 62 per unit time, and as a result, it is possible to reduce scattering and overflowing of the liquid flowing out of the drain port 62 and at the same time to suppress the prolongation of the drainage time.

In the case of this embodiment, the control unit 60 is configured as a computer including a processor and a storage unit 60A. The storage unit 60A stores correspondence information that associates the liquid level with the amount of opening of the drain valve 54.

Figure 3:
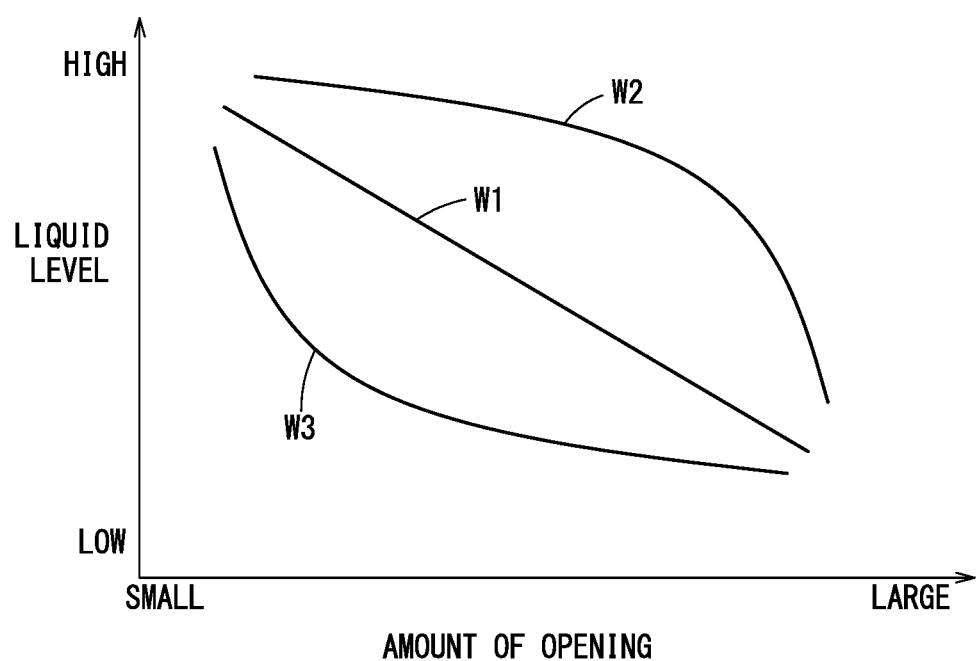
FIG. 3 is a relational graph showing the relationship between liquid level and open volume.

FIG. 3 is a relational graph showing the relationship between the liquid level and the amount of opening. The relationship graph shows a straight line waveform W1 in which the relationship between the liquid level and the amount of opening is linear, a convex curve waveform W2 in which the relationship is non-linear, and a concave curve waveform W3 in which the relationship is non-linear. The straight line waveform W1, the convex curve waveform W2, and the concave curve waveform W3 all have a relationship in which the amount of opening increases as the liquid level decreases.

The storage unit 60A stores relational expressions or tables indicating at least one relation among the straight waveform W1, the convex curve waveform W2, and the concave curve waveform W3 as correspondence information. The table includes a plurality of liquid levels and the amount of opening associated with each of the plurality of liquid levels.

When the relational expressions are stored in the storage unit 60A, the control unit 60 calculates the amount of opening corresponding to the liquid level detected by the liquid level sensor 58 using the relational expressions stored in the storage unit 60A, and controls the actuator 56 in a manner so that the calculated amount of opening is obtained. Thus, in comparison with the case where the table is stored in the storage unit 60A, the amount of occupation by correspondence information with respect to the storage unit 60A can be reduced.

When the table is stored in the storage unit 60A, the control unit 60 uses the table to obtain the amount of opening corresponding to the liquid level detected by the liquid level sensor 58, and controls the actuator 56 so as to reach the obtained amount of opening. Thus, the actuator 56 can be controlled without calculating the amount of opening, and as a result, the load on the control unit 60 can be reduced.

When a plurality of relational expressions or tables are stored as correspondence information, the control unit 60 may control the actuator 56 based on the correspondence information selected from the plurality of pieces of correspondence information according to the operation of the operator or the like. Thus, even if the type of liquid tank 52 is changed because of, for example, replacing the liquid tank 52 with one for a different type of electric discharge machine 10 or one having a different shape, size, or the like, it is possible to reduce scattering and overflowing of the liquid flowing out from the drain port 62 while preventing the draining time from being prolonged.

Moreover, the control unit 60 may control the actuator 56 in manner so that the flow rate of the liquid drained from the drain port 62 becomes constant. For example, the control unit 60 controls the actuator 56 based on correspondence information indicating the relationship between the amount of opening and the liquid level at which the flow rate of the liquid drained from the drain port 62 becomes constant. When a flow rate sensor is provided at the drain port 62, the control unit 60 may perform feedback control on the actuator 56 so that the flow rate detected by the flow rate sensor becomes a target value. The control unit 60 controls the actuator 56 so that the flow rate of the liquid drained from the drain port 62 is constant, thereby being able to suppress changes in the amount of outflow, which is the amount of liquid flowing out from the drain port 62 per unit time.

Modified Example

The above embodiment may be modified as follows.

For example, the control unit 60 may control the actuator 56 in such a way that the amount of opening of the drain valve 54 increases as the liquid level decreases by switching the driving power to be output to the actuator 56 according to the level of the signal output from the liquid level sensor 58. In this way, the actuator 56 can be controlled without digital computation.

Inventions That Can be Grasped From the Above Description

The electric discharge machine (10) includes the liquid tank (52) configured to store liquid, the drain valve (54) configured to open and close the drain port (62) for draining the liquid stored in the liquid tank (52), and the actuator (56) configured to drive the drain valve (54). The electric discharge machine (10) further includes the liquid level sensor (58) configured to detect the liquid level of liquid stored in the liquid tank (52), and a control unit (60) configured to control the actuator (56) in a manner so that the amount of opening of the drain valve (54) increases as the liquid level detected by the liquid level sensor (58) decreases. This makes it possible to suppress changes in the amount of outflow, the amount of liquid flowing out of the drain port (62) per unit time, and as a result, it is possible to reduce scattering and overflowing of the liquid flowing out of the drain port (62) and at the same time to suppress the prolongation of the drainage time.

The electric discharge machine (10) may further include the storage unit (60A) in which correspondence information that associates the liquid level with the amount of opening is stored, wherein the control unit (60) may control the actuator (56) in a manner so that the amount of opening corresponds to the liquid level detected by the liquid level sensor (58). Thus, even if there is a design change or the like of the liquid tank (52), the actuator (56) can be controlled only by changing the correspondence information without changing a mechanical system, and it is easy to cope with the design change or the like of the liquid tank (52).

The liquid level may include a plurality of liquid levels. The correspondence information may be a table that includes the plurality of liquid levels; and the amount of opening associated with each of the plurality of liquid levels. Thus, the actuator (56) can be controlled without computing the amount of opening, and as a result, the load on the control unit (60) can be reduced.

The correspondence information may include a plurality of pieces of correspondence information. The storage unit (60A) may store the plurality of pieces of correspondence information, and the control unit (60) may control the actuator (56) based on correspondence information selected from the plurality of pieces of correspondence information.

Thus, even if the type of the liquid tank (52) is changed, it is possible to reduce the scattering and overflow of the liquid flowing out from the drain port (62) while suppressing the prolongation of the draining time.

The control unit (60) may control the actuator (56) in a manner so that the flow rate of the liquid drained from the drain port (62) is constant. This makes it possible to suppress changes in the amount of outflow, which is the amount of liquid flowing out from the drain port (62) per unit time.

The liquid tank (52) may be a work-pan (17) configured to store the liquid for immersing the workpiece. This makes it possible to discharge liquid containing sludge generated through machining.

The actuator (56) may include a servomotor (56A). This makes it possible to precisely change the amount of opening of the drain valve (54).

EXPLANATION OF SYMBOLS

Reference Signs List

10: electric discharge machine
17: work-pan
52: liquid tank
54: drain valve
56: actuator
56A: servomotor
58: liquid level sensor
60: control unit
60A: storage Unit
62: drain port

The invention claimed is:

1. An electric discharge machine comprising a liquid tank configured to store liquid, a drain valve configured to open and close a drain port for draining the liquid stored in the liquid tank, and an actuator configured to drive the drain valve, the electric discharge machine further comprising:
a liquid level sensor configured to detect a liquid level of the liquid stored in the liquid tank; and
a control unit configured to control the actuator in a manner so that an amount of opening of the drain valve increases as the liquid level detected by the liquid level sensor decreases.

2. The electric discharge machine according to claim 1, further comprising
a storage unit in which correspondence information that associates the liquid level with the amount of opening is stored,
wherein the control unit controls the actuator in a manner so that the amount of opening corresponds to the liquid level detected by the liquid level sensor.

3. The electric discharge machine according to claim 2, wherein
the liquid level comprises a plurality of liquid levels, and
the correspondence information is a table that includes the plurality of liquid levels and the amount of opening associated with each of the plurality of liquid levels.

4. The electric discharge machine according to claim 2, wherein
the correspondence information comprises a plurality of pieces of correspondence information,
the storage unit stores the plurality of pieces of correspondence information, and
the control unit controls the actuator based on correspondence information selected from the plurality of pieces of correspondence information.

5. The electric discharge machine according to claim 1, wherein
the control unit controls the actuator in a manner so that a flow rate of the liquid drained from the drain port is constant.

6. The electric discharge machine according to claim 1, wherein
the liquid tank is a work-pan configured to store the liquid for immersing a workpiece.

7. The electric discharge machine according to claim 1, wherein
the actuator includes a servomotor.

* * * * *